United States Patent
Onishi

(10) Patent No.: US 10,182,220 B2
(45) Date of Patent: Jan. 15, 2019

(54) MODELED OBJECT DISTRIBUTION MANAGEMENT SYSTEM, MODELED OBJECT DISTRIBUTION MANAGEMENT APPARATUS AND NON-TRANSITORY COMPUTER READABLE STORAGE MEDIUM

(71) Applicant: FUJI XEROX CO., LTD., Tokyo (JP)

(72) Inventor: Kazunori Onishi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 17 days.

(21) Appl. No.: 15/364,636

(22) Filed: Nov. 30, 2016

(65) Prior Publication Data

US 2017/0309078 A1 Oct. 26, 2017

(30) Foreign Application Priority Data

Apr. 22, 2016 (JP) ................................. 2016-086000

(51) Int. Cl.
*G06T 19/20* (2011.01)
*H04N 13/00* (2018.01)
(Continued)

(52) U.S. Cl.
CPC ............ *H04N 13/00* (2013.01); *G06Q 30/02* (2013.01); *G06Q 30/0241* (2013.01); *G06Q 30/0601* (2013.01); *G06Q 30/0641* (2013.01)

(58) Field of Classification Search
USPC .......................................................... 345/419
See application file for complete search history.

(56) References Cited

U.S. PATENT DOCUMENTS

| 9,486,878 B2 * | 11/2016 | Buller ................ B23K 26/346 |
| 2003/0043262 A1 * | 3/2003 | Takemoto ............... G06F 21/31 |
| | | 348/46 |

(Continued)

FOREIGN PATENT DOCUMENTS

| JP | 11-001813 A | 1/1999 |
| JP | 11-110451 A | 4/1999 |

(Continued)

OTHER PUBLICATIONS

Communication dated Mar. 28, 2017 from the Japanese Patent Office in counterpart application No. 2016-086000.

(Continued)

*Primary Examiner* — Kimbinh T Nguyen
(74) *Attorney, Agent, or Firm* — Sughrue Mion, PLLC

(57) ABSTRACT

A modeled object distribution management system includes a creator storage unit, a first display controller and a second display controller. The creator storage unit stores modeled object-related information including information indicating stereoscopic images of created modeled objects. The first display controller displays the stereoscopic images to allow a client to browse the stereoscopic images, by using the information indicating the stereoscopic images which is stored in the creator storage unit. The second display controller displays a modeling plan to allow the client to browse the modeling plan. The modeling plan includes a modeling method and a material which are used to model a modeled object corresponding to a stereoscopic image selected by the client from the stereoscopic images displayed in the first display controller.

10 Claims, 13 Drawing Sheets

(51) Int. Cl.
    *G06Q 30/02*     (2012.01)
    *G06Q 30/06*     (2012.01)

(56) References Cited

U.S. PATENT DOCUMENTS

| | | |
|---|---|---|
| 2004/0148136 A1 | 7/2004 | Sasaki et al. |
| 2011/0023089 A1* | 1/2011 | Yoshimine ............ G06Q 20/10 726/3 |
| 2013/0100132 A1* | 4/2013 | Katayama .......... H04N 13/0022 345/420 |
| 2015/0281790 A1* | 10/2015 | Yoshimine ............ G06Q 20/10 725/61 |
| 2015/0325038 A1* | 11/2015 | Baker ................ H04N 13/0007 345/426 |

FOREIGN PATENT DOCUMENTS

| | | |
|---|---|---|
| JP | 2002-157474 A | 5/2002 |
| JP | 2002-175381 A | 6/2002 |
| JP | 2004-164024 A | 6/2004 |
| JP | 2009-134644 A | 6/2009 |
| JP | 2009-205474 A | 9/2009 |
| JP | 2012-79094 A | 4/2012 |

OTHER PUBLICATIONS

Communication dated Dec. 13, 2016 from the Japanese Patent Office in counterpart Japanese application No. 2016-086000.

\* cited by examiner (CONT.)

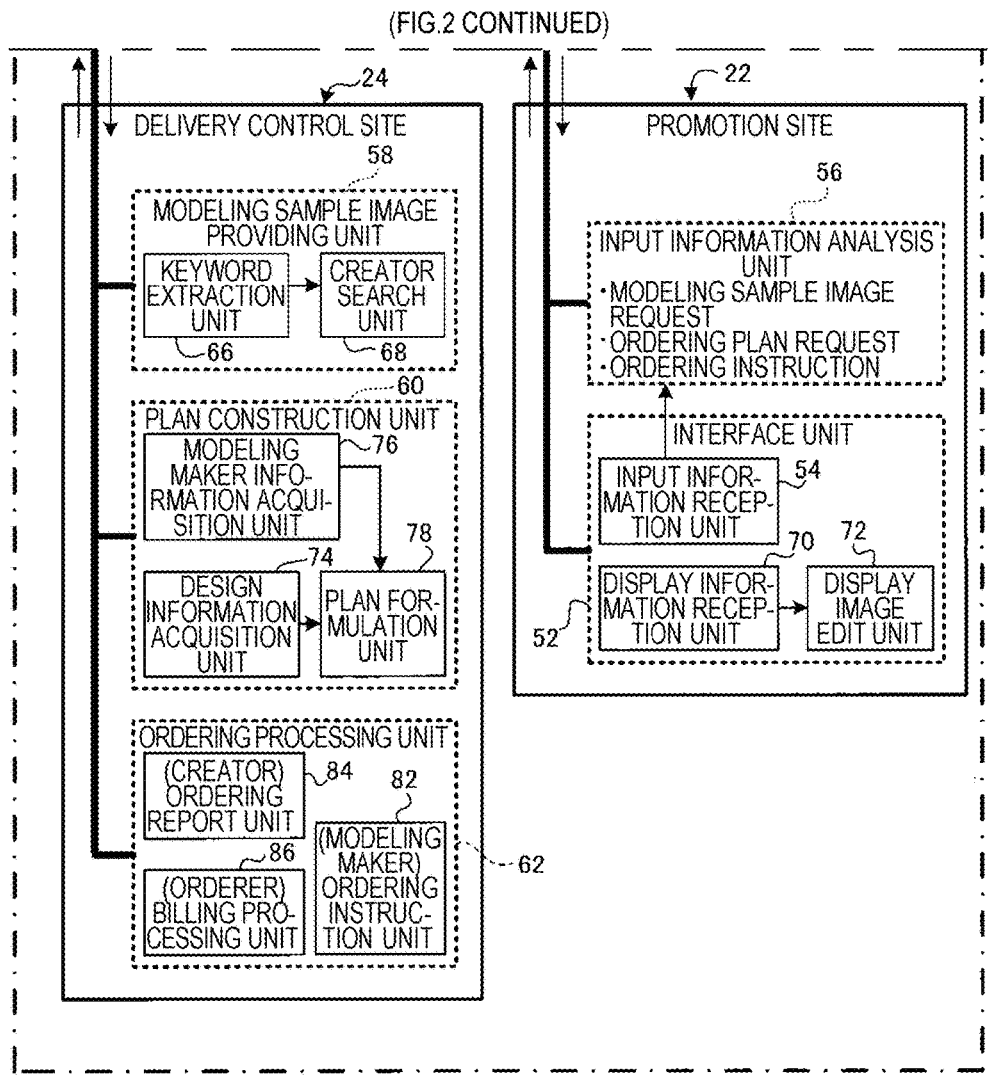

| MODELING MAKER ID | 112233456 |
|---|---|
| MODELING METHOD | VAT PHOTOPO-LYMERIZATION (E) |
| | MATERIAL EXTRUSION (O) |
| | MATERIAL JETTING (F) |
| ADOPTABLE MATERIAL | ACRYL (A) |
| | EPOXY (P) |
| | ABS (B) |
| | UV SETTING RESIN (V) |

(DISPLAY SCREEN OF CLIENT TERMINAL 18)

MODELED OBJECT DISTRIBUTION MANAGEMENT SYSTEM, MODELED OBJECT DISTRIBUTION MANAGEMENT APPARATUS AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2016-086000 filed Apr. 22, 2016.

BACKGROUND

Technical Field

The present invention relates to a modeled object distribution management system, a modeled object distribution management apparatus and a non-transitory computer readable storage medium.

SUMMARY

According to an aspect of the invention, a modeled object distribution management system includes a creator storage unit, a first display controller and a second display controller. The creator storage unit stores modeled object-related information including information indicating stereoscopic images of created modeled objects. The first display controller displays the stereoscopic images to allow a client to browse the stereoscopic images, by using the information indicating the stereoscopic images which is stored in the creator storage unit. The second display controller displays a modeling plan to allow the client to browse the modeling plan. The modeling plan includes a modeling method and a material which are used to model a modeled object corresponding to a stereoscopic image selected by the client from the stereoscopic images displayed in the first display controller.

BRIEF DESCRIPTION OF THE DRAWINGS

Exemplary embodiments of the present invention will be described in detail based on the following figures, wherein.

DETAILED DESCRIPTION

Figure 1:
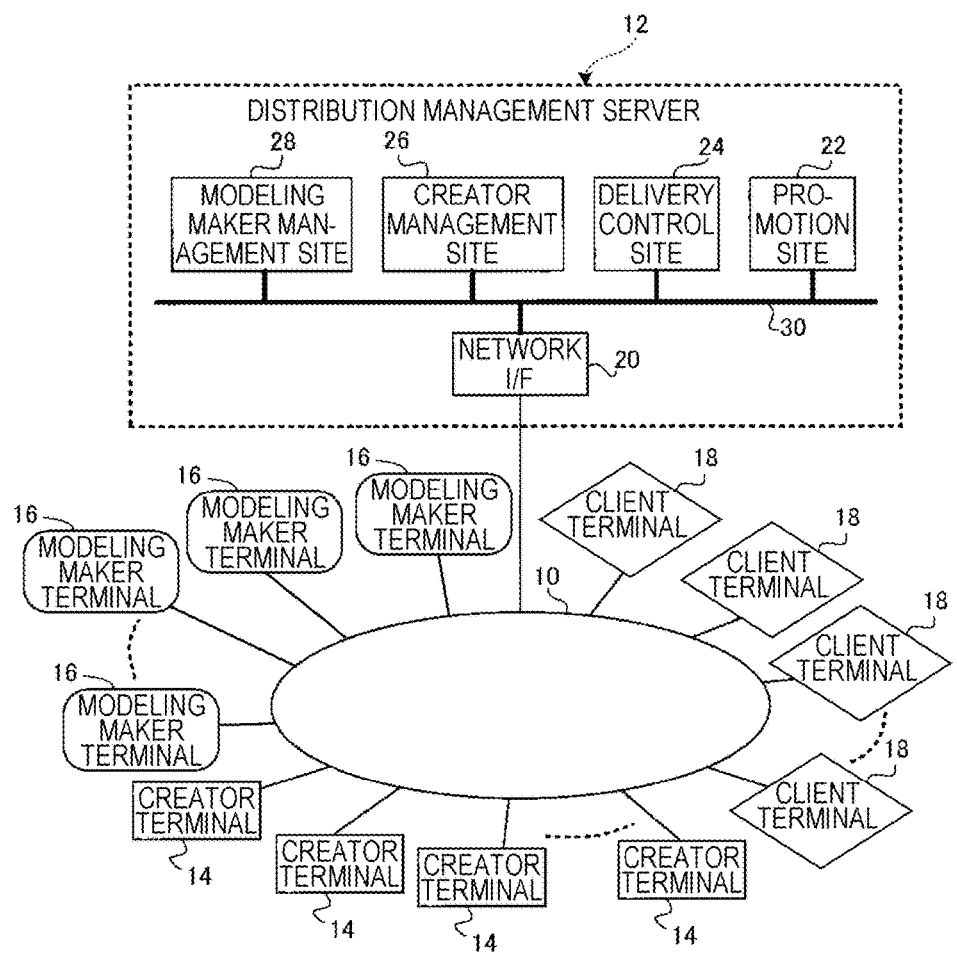
FIG. 1 is a view illustrating the entire configuration of a modeled object distribution management system according to an exemplary embodiment.

FIG. 1 is a schematic view illustrating the entire configuration of a modeled object distribution management system according to an exemplary embodiment, which is constructed around a communication network 10.

As illustrated in FIG. 1, a distribution management server 12 forming the backbone of the modeled object distribution management system is connected to the communication network 10.

Plural creator terminals 14 retained by creators who create modeled objects, plural modeling maker terminals 16 retained by modeling makers who make the modeled objects, and plural client terminals 18 retained by clients who request the modeling makers to make the modeled objects created by the creators are connected to the communication network 10.

The creator terminals 14, the modeling maker terminals 16 and the client terminals 18 may be basically implemented with, e.g., versatile personal computers (PCs) but may be implemented with dedicated terminal devices accessible to the distribution management server 12 of the exemplary embodiment. In particular, the client terminals 18 may be implemented with portable information terminals such as mobile phones, smartphones, tablet PCs or the like.

That is, each of the distribution management server 12, the creator terminals 14, the modeling maker terminals and the client terminals 18 may have a basic configuration including a CPU, a RAM, a ROM, an I/O, and a bus interconnecting these components such as a data bus and a control bus although not illustrated. As necessary, an input device such as a keyboard, a mouse or the like, a monitor and a hard disk as a large-scale recording medium serving as a database may be connected to the I/O.

The communication network 10 is, e.g., a local area network (LAN) or may be plural LANs interconnected by a world area network (WAN). All communication networks including the communication network 10 need not have wired connections. That is, some or all may be wireless communication networks which transmit/receive information wirelessly.

The distribution management server 12 is appropriately connected to each of the creator terminal 14, the modeling maker terminal 16 and the client terminal 18 for information exchange.

(Creator Terminal 14)

The creator terminal 14 has a role to provide (upload) information about a creation made by a creator to the distribution management server 12 via the communication network 10. Such provision of information generates a point of contact with a client, thereby, for example, making the creator's creative intention clear and encouraging sales promotion.

Here, a creator refers to one who wishes to offer information related to his/her own registered modeled object to general clients, regardless of whether he/she is well-known or unknown. Examples of the creator include a general modeling lover who wishes to exhibit and sell a modeled object created as a hobby.

In the present exemplary embodiment, when a creator makes a creation, it is assumed that information about the creation provided from a creator terminal 14 includes design information such as a design drawing based on which the creation can be manufactured by a modeling maker.

The design information may be six views (a from view, a rear view, a right side view, a left side view, a top view and a bottom view) which can specify a modeled object in the respect of design or may be image data obtained by capturing the modeled object at plural viewpoints. That is, the design information is information which can be applied as modeling information at least when the modeled object is modeled. Therefore, the creator is also a designer who designs a creation.

As a modification, instead of being retained by the creator himself/herself, the creator terminal 14 may be retained and operated by a mediator who produces design information from a real modeled object brought by the creator and provides the produced design information to the distribution management server 12.

(Modeling Maker Terminal 16)

The modeling maker terminal 16 is configured to present types of modeling methods for making a modeled object and types of materials adoptable for modeling to the distribution management server 12 via the communication network 10.

One example of a relationship between the type of a modeling method and the type of a material adoptable for a modeling method is as follows (modeling method . . . adoptable material).

(1) Vat photopolymerization method . . . UV setting resin
(2) Binder jetting method . . . gypsum, ceramics, sand, calcium, plastics
(3) Material extrusion method . . . acrylonitrile butadiene styrene rein (ABS), polylactic acid (PLA), Nylon 12, polycarbonate (PC), polyphenylsulfone (PPSF)
(4) Material jetting method . . . UV setting resin, fat, wax, solder
(5) Sheet lamination method . . . paper, resin sheet, aluminum sheet
(6) Powder bed fusion method . . . engineering plastics, Nylon, metal
(7) Directed energy deposition method . . . metal The modeling maker terminal 16 also acts as a reception machine which receives an ordering of modeling.

(Client Terminal 18)

The client terminal 18 is a communication device which accesses the distribution management server 12 via the communication network 10 when a client whiskies a modeled object.

In a case where the client terminal 18 is a versatile communication terminal, a modeled object ordering application program is registered in the versatile communication terminal in advance so that the versatile communication terminal acts as the client terminal 18. The modeled object ordering application program has a function (viewer function) of browsing a modeled object registered in the distribution management server 12, a function (ordering function) of ordering a desired modeled object, and a function (billing function) capable of performing procedures of money transfer based on the ordering.

(Distribution Management Server 12)

As illustrated in FIG. 1, the distribution management server 12 includes a network I/F 20 connected to the communication network 10 and has a platform including a promotion site 22 as a promotion execution unit that executes the promotion of a creator for the client terminal 18, a delivery control site 24 as a delivery controller that provides a sample (3D image) of a modeled object and a modeling plan of the modeled object and receives an ordering of the modeled object, a creator management site 26 as a creator management unit that manages information about a modeled object designed by the creator and received from the creator terminal 14, and a modeling maker management site 28 as a modeling maker management unit that manages information about a modeling maker who manufactures a modeled object, all of which are interconnected by a bus 30 for exchange of information.

The distribution management server 12 is configured to appropriately model (shape) the modeled object designed by the creator and supports sales totally by using the promotion site 22, the delivery control site 24, the creator management site 26 and the modeling maker management site 28 individually or in combination.

Figure 2:
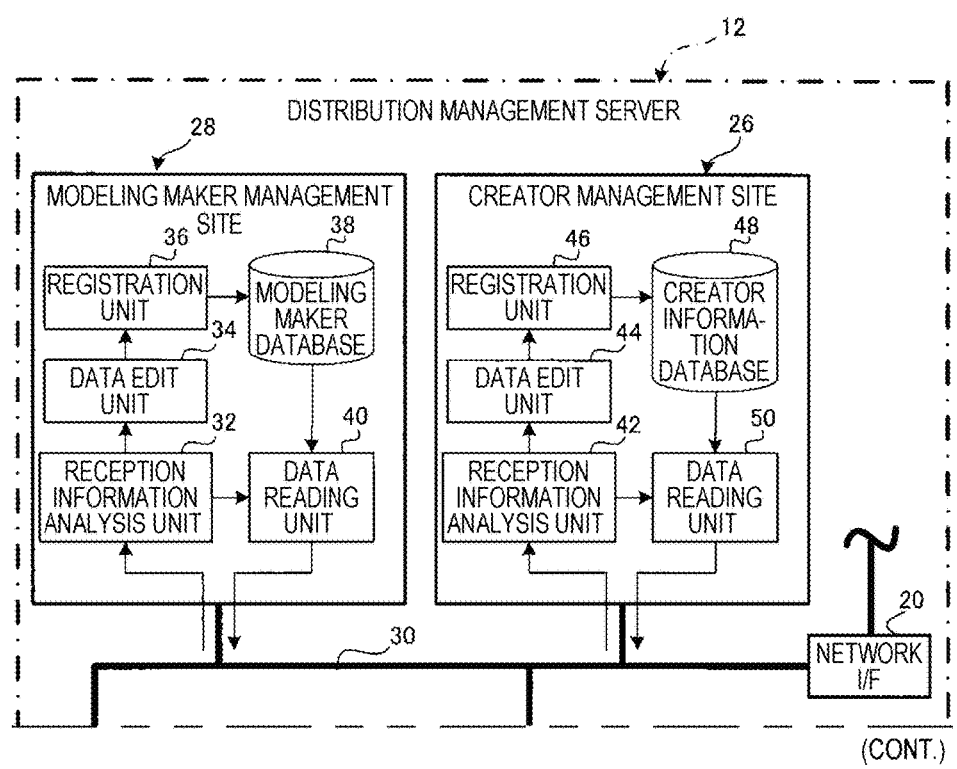
FIG. 2 is a functional block diagram illustrating a modeling maker management site, a creator management site, a delivery control site and a promotion site which are constructed in a modeled object distribution management server constituting the modeled object distribution management system according to the present exemplary embodiment.

FIG. 2 is a functional block diagram illustrating the sites of the distribution management server 12, processes of which are classified by function.

(Modeling Maker Management Site 28)

Modeling makers are registered in the distribution management server 12 in advance.

A modeling maker who wishes registration sends information based on his/her own modeling technique to the distribution management server 12 by means of the modeling maker terminal 16 (see FIG. 1).

The modeling maker management site 28 includes a reception information analysis unit 32 which receives information from the modeling maker terminal 16.

Figure 3:
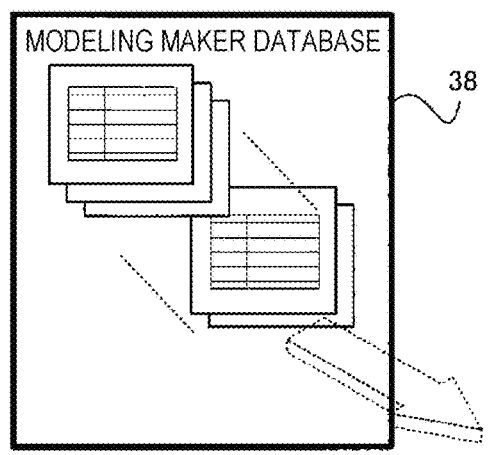
FIG. 3 is a conceptual view illustrating information stored in a modeling maker database according to the present exemplary embodiment.

The reception information analysis unit 32 is connected to a data edit unit 34. The data edit unit 34 generates list information including a modeling maker ID, a modeling method and an adoptable material, for example, as illustrated in FIG. 3.

The generated list information is registered in a modeling maker database 38 by means of a registration unit 36.

The modeling maker list information registered in the modeling maker database 38 can be read by a data reading unit 40. A keyword for reading may be at least one of the modeling maker, the modeling method and the adoptable material which is specified from among items of the list information.

(Creator Management Site 26)

Creators who design modeled objects are registered in the distribution management server 12 in advance.

A creator who wishes registration sends information about his/her own created modeled object to the distribution management server 12 by means of the creator terminal 14 (see FIG. 1).

The creator management site 26 includes a reception information analysis unit 42 which receives information from the creator terminal 14.

Figure 4:
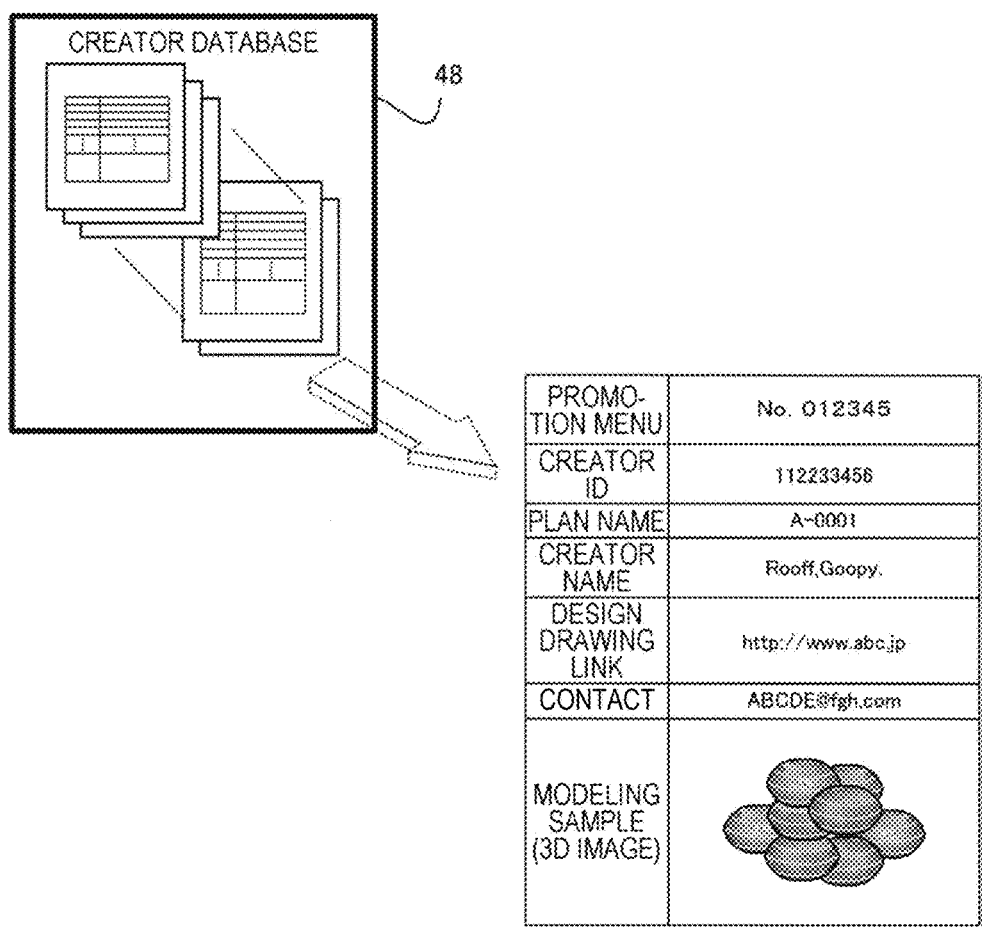
FIG. 4 is a conceptual view illustrating information stored in a creator database according to the present exemplary embodiment.

The reception information analysis unit 42 is connected to a data edit unit 44 and generates list information including a creator ID, a plan name, a creator name, a design drawing link, contact and a modeling sample (e.g., 3D image), for example, as illustrated in FIG. 4.

The generated list information is registered in a creator information database 48 by means of a registration unit 46.

The creator list information registered in the creator information database 48 can be read by a data reading unit 50. A keyword for reading may be at least one of the creator ID, the plan name, the creator name, the design drawing link, the inquiry and the modeling sample (3D image) which is specified from among items of the list information.

Basically, since a client is the subject of browsing a modeling sample (3D image) and placing an order of a modeled object, the client makes a search based on identification information of potentially registered modeling samples.

(Promotion Site 22)

The promotion site 22 includes an interface unit 52 responsible for communication with the client terminal 18 (see FIG. 1). The interface unit 52 is provided with an input information reception unit 54 which receives information from the client terminal 18.

The information received in the input information reception unit 54 is reported to the input information analysis unit 56. The input information analysis unit 56 analyzes whether the input information is a modeling sample image request, an ordering plan request or an ordering instruction.

When the input information analyzed by the input information analysis unit 56 is the modeling sample image request, specific information specifying a modeled object is presented from the client terminal 18. The presented specific information is sent to a modeling sample image providing unit 58 (details of which will be described later) of the delivery control site 24.

The specific information specifying a modeled object includes a function, use and a shape of a modeled object and is, for example, words which can be specified from client's sentence information such as "accessories used in advertising in a store" or "building blocks made of materials safe for children".

Other specific information may be information specifying a creator personally or may be specific information containing a keyword from which the unspecified number of creators such as "a person of career who won a xxx design award" are extracted.

When the input information analyzed by the input information analysis unit 56 is the ordering plan request, ordering information is sent to a plan construction unit (details of which will be described later) of the delivery control site 24 so as to construct an ordering plan based on the ordering plan request information received from the client terminal 18.

When the input information analyzed by the input information analysis unit 56 is the ordering instruction, this means that a client has placed an order based on a promotion menu which is constructed by the plan construction unit 60 and presented to the client, and the ordering instruction is sent to an ordering processing unit 62 (details of which will be described later) which orders modeling to a modeling maker and executes a billing process.

(Delivery Control Site 24)

The delivery control site 24 includes the modeling sample image providing unit 58 which searches modeled objects from the information related to modeled objects uploaded and registered by creators according to a request (specific information) from a client and provides a modeling sample image 64 (see FIG. 5) to be displayed on a screen of the client terminal 18.

The modeling sample image providing unit 58 is provided with a keyword extraction unit 66 which extracts a keyword to be presented when a client accesses the distribution management server 12.

The keyword extraction unit 66 extracts a keyword which is a word specifying a modeled object from the input information received in the promotion site 22.

The keyword extraction unit 66 is connected to a creator search unit 68 and sends the extracted keyword to the creator search unit 68.

The creator search unit 68 accesses the creator management site 26, reads a creator matching the keyword, and sends the read creator to a display information reception unit 70 of the promotion site 22. In the promotion site 22, a display image edit unit 72 edits the modeling sample image 64 illustrated in FIG. 5 based on display information received by the display information reception unit 70 and sends the edited image 64 to the client terminal 18.

The delivery control site 24 includes the plan construction unit 60 which constructs a plan of the promotion menu based on information of an ordering plan requested by a client when the client requests the ordering plan from the modeling sample images provided by the modeling sample image providing unit 58 and which presents the constructed plan to the client.

The plan construction unit 60 is provided with a design information acquisition unit 74 and a modeling maker information acquisition unit 76. The design information acquisition unit 74 acquires information related to the modeled objects uploaded and registered by the creators according to the request (ordering plan request) from the client. The modeling maker information acquisition unit 76 acquires information related to the modeling uploaded and registered by modeling makers according to the request (ordering plan request) from the client. The design information acquisition unit 74 and the modeling maker information acquisition unit 76 send the acquired information to a plan formulation unit 78.

The plan formulation unit 78 formulates an ordering plan of a modeled object desired by the client, generates a promotion image 80A or 80B (see FIG. 6A or 6B), and sends the generated promotion image to the promotion site 22. In the promotion site 22, based on the display information received by the display information reception unit 70, the display image edit unit 72 edits the promotion image 80A or 80B illustrated in FIG. 6A or 6B and sends the edited promotion image to the client terminal 18.

The delivery control site 24 includes an ordering instruction unit 82, an ordering report unit 84 and a billing processing unit 86. When a client places an order based on the promotion menu constructed by the plan construction unit 60 and presented to the client, the ordering instruction unit 82 orders modeling to a modeling maker based on an ordering instruction received from the client terminal 18. The ordering report unit 84 reports to a creator that the order has been placed. The billing processing unit 86 distributes money received from the client to the modeling maker, the creator and a manager of the distribution management server 12 according to the present exemplary embodiment.

Hereinafter, an operation of the present exemplary embodiment will be described.

The distribution management server 12 of the present exemplary embodiment sequentially registers modeled objects, cancel registration of molded objects, register new modeling makers, update registration of modeling makers, and cancel registration of modeling makers to thereby always manage new information.

For example, when the predetermined number of years elapses after a creation is initially registered, registration of the creation may be automatically cancelled, although this process depends on the storage capacity of the distribution management server 12. A registration period may be individually determined at the time of the initial registration.

For the existing modeling makers, it is preferable to sequentially update to latest information in response to newly introducing a modeling machine, changing a modeling machine, discarding a modeling machine and the like.

Figure 7:
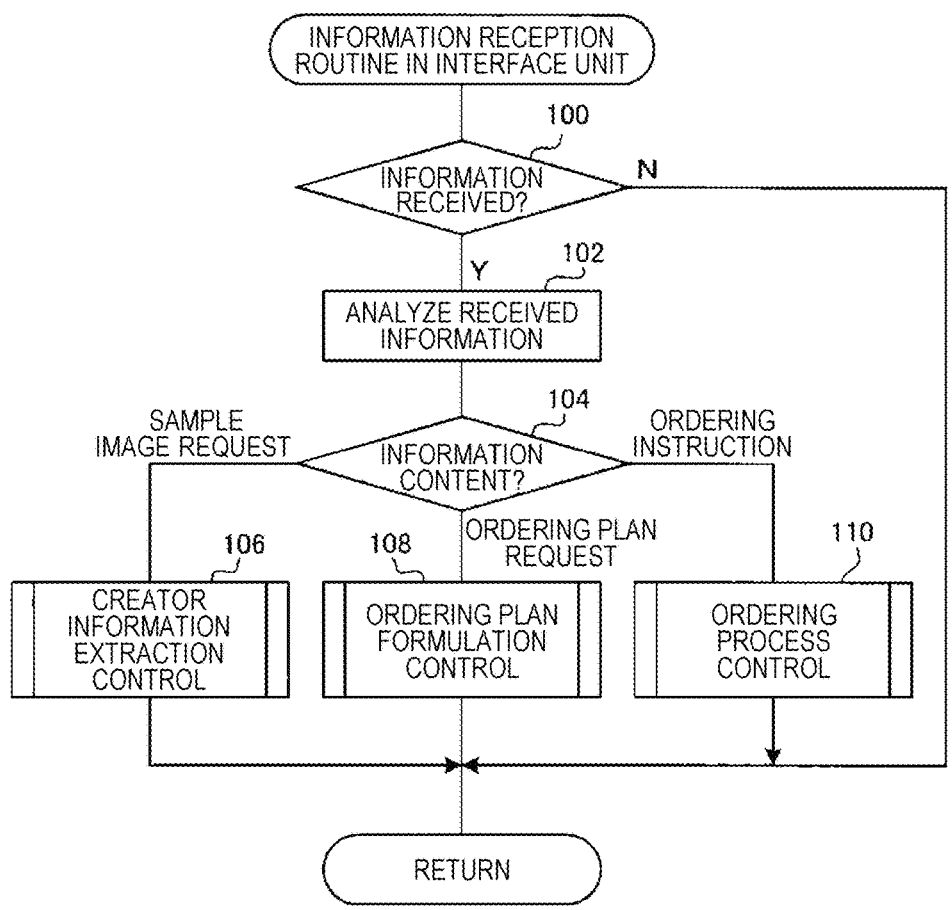
FIG. 7 is a control flow chart illustrating a flow of information reception in an interface unit in the promotion site of the distribution management server according to the present exemplary embodiment.

FIG. 7 is a control flow chart illustrating a flow of information reception in the interface unit 52 of the promotion site 22 of the distribution management server 12 according to the present exemplary embodiment.

At step 100, it is determined whether or not information has been received by the input information reception unit 54. When it is determined that information has not been received, this routine is ended.

When it is determined in step 100 that information has been received, the flow proceeds to step 102 where the received information is analyzed. Then, the flow proceeds to step 104.

At step 104, it is determined whether the information content analyzed in step 102 is a sample image request, an ordering plan request or an ordering instruction.

When it is determined in step 104 that the analyzed information is the sample image request, the flow proceeds to step 106 where creator information extraction control (see FIG. 8, details of which will be described later) is executed and then this routine is ended.

When it is determined in step 104 that the analyzed information is the ordering plan request, the flow proceeds to step 108 where ordering plan formulation control (see FIG. 9, details of which will be described later) is executed and then this routine is ended.

When it is determined in step 104 that the analyzed information is the ordering instruction, the flow proceeds to step 110 where ordering process control (see FIG. 10, details of which will be described later) is executed and then this routine is ended.

(Creator Information Extraction Control)

Figure 8:
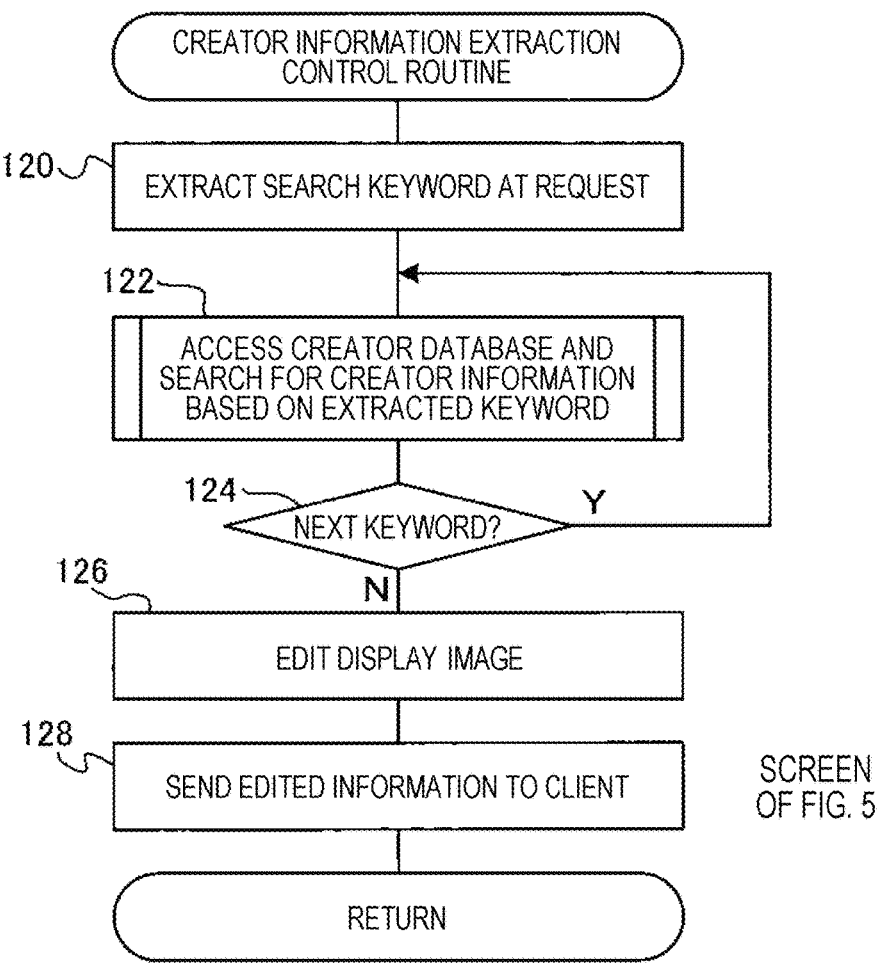
FIG. 8 is a flow chart illustrating a creator information extraction control routine executed in step 106 of FIG. 7.

FIG. 8 is a flow chart illustrating a creator information extraction control routine executed in step 106 of FIG. 7.

From the information received from the client terminal 18, specific information specifying a modeled object is presented at the sample image request.

The specific information specifying the modeled object includes a function, use and a shape of the modeled object and is, for example, words which can be specified from client's sentence information such as "accessories used in attracting consumers and advertising in a store" or "building blocks made of materials safe for children".

Other specific information may be information specifying a creator personally or may be specific information containing a keyword from which the unspecified number of creators such as "a person(s) of career who won a xxx design award" are extracted. Sample images of all registered modeled objects may be requested (with a keyword of "all" or the like).

At step 120, a search keyword at the time of sample image request is extracted from the specific information and the routine proceeds to step 122.

At step 122, an access is made to the creator information database 48 of the creator management site 26 to search for creator information based on the extracted keyword.

At step 122, for example, when a search with one keyword is terminated, the routine proceeds to step 124 to determine whether or not a next keyword exists. On the other hand, the search process may not be performed on keywords one by one, but may be performed on plural keywords as the logical product or logical sum at once.

When it is determined in step 124 that the next keyword exists, the routine proceeds to step 122 to continue the search based on a new keyword.

When it is determined in step 124 that the next keyword does not exist, the routine proceeds to step 126 where the display image is edited. Subsequently, the routine proceeds to step 128 where the edited information is sent to the client terminal 18 and then is ended.

Figure 5:
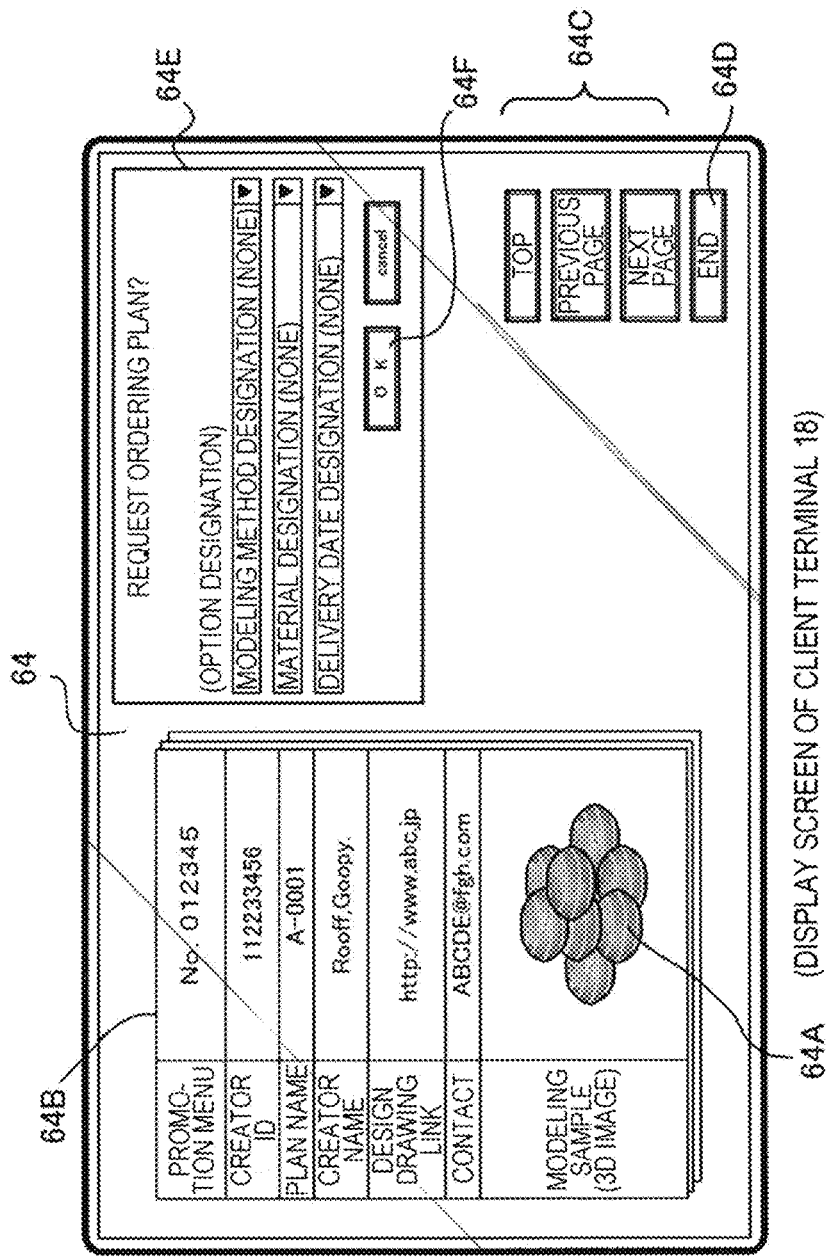
FIG. 5 is a front view of a display screen of a client terminal on which a modeling sample image provided from the promotion site is displayed according to the present exemplary embodiment.

Thus, as illustrated in FIG. 5, a modeling sample image 64 including a 3D sample image 64A and a table 64B is displayed on the display screen of the client terminal 18.

In addition to the 3D sample image 64A, the table 64B is displayed with information of items including promotion menu number, a creator ID, a plan name, a creator name, a design drawing link and contact, as information that specifies the 3D sample image 64A. However, this form of display is just illustrative but at least a sample image (3D) of a modeled object needs to be displayed.

For example, the table 64B has a widow display format and the forefront table 64B is replaced in response to operation of operation buttons 64C including a top button, a previous page button and a next page button. An end button 64D is operated to instruct display end. The screen may be divided to browse the table 64B while turning plural pages displaying plural sample images.

A request image 64E promoting an ordering plan request is displayed in the modeling sample image 64. When an OK button 64F is operated, a modeled object ordering request related to the currently displayed table 64B in the forefront is executed. This operation of the OK button 64F corresponds to an "ordering plan request" among the received information which is analyzed in the step 102 of FIG. 7.

The 3D sample image 64A may be in such a form that a viewpoint can be changed in the x-y-z direction. That is, with plural viewpoints combined in advance with respect to the common origin, the 3D sample image 64A may be switched to images from different viewpoints in accordance with operations (such as cursor movement, tap operation, flick operation, swipe operation, and pinch operation) for viewpoint switching.

These operations (such as cursor movement, tap operation, flick operation, swipe operation, and pinch operation) can also be applied to designate items in addition to the 3D viewpoint switching.

(Ordering Plan Formulation Control)

Figure 9:
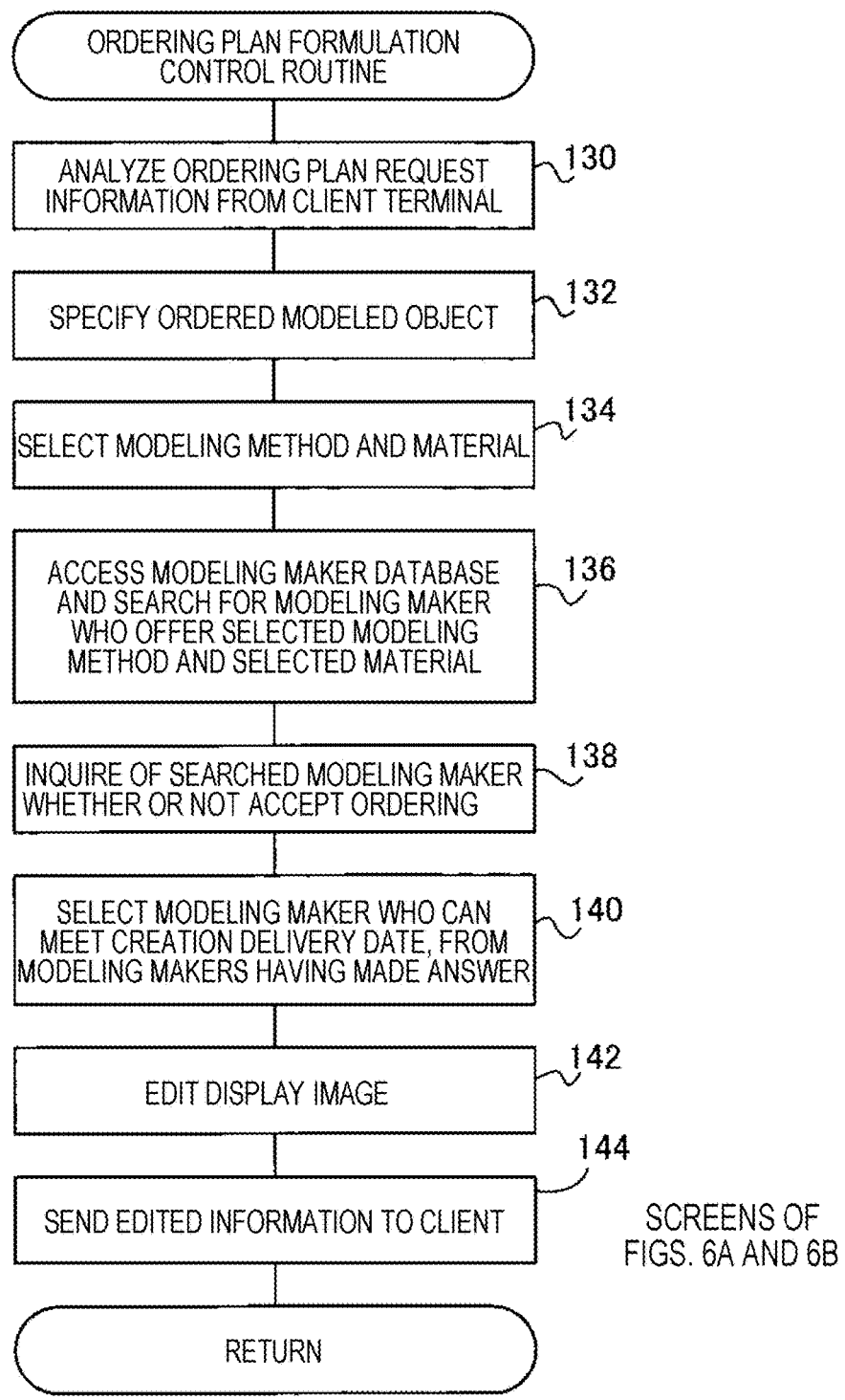
FIG. 9 is a flow chart illustrating an ordering plan formulation control routine executed in step 108 of FIG. 7.

FIG. 9 is a flow chart illustrating an ordering plan formulation control routine executed in step 108 of FIG. 7 in response to the ordering plan request from the client terminal 18.

At step 130, the ordering plan request information from the client terminal 18 is analyzed. Subsequently, the routine proceeds to step 132 to specify a modeled object based on the ordering plan request information and then proceeds to step 134.

At step 134, modeling method information and material information are selected based on the specified modeled object.

At next step 136, an access is made to the modeling maker database 38 of the modeling maker management site 28 to search for a modeling maker who offers the selected modeling method and the selected material.

At next step 138, an access is made to the modeling maker terminal 16 owned by the searched modeling maker to inquire whether or not the modeling maker can accept the ordering. Subsequently, the routine proceeds to step 140 to select a modeling maker who can make a creation in a creative period in the current situation among modeling makers having made answers and then proceeds to step 142.

At next step 142, a promotion image guiding a modeling plan is edited based on the selected modeling maker. Subsequently, the routine proceeds to step 144 to send the edited information to the client terminal 18 and is then ended.

Figure 6A:
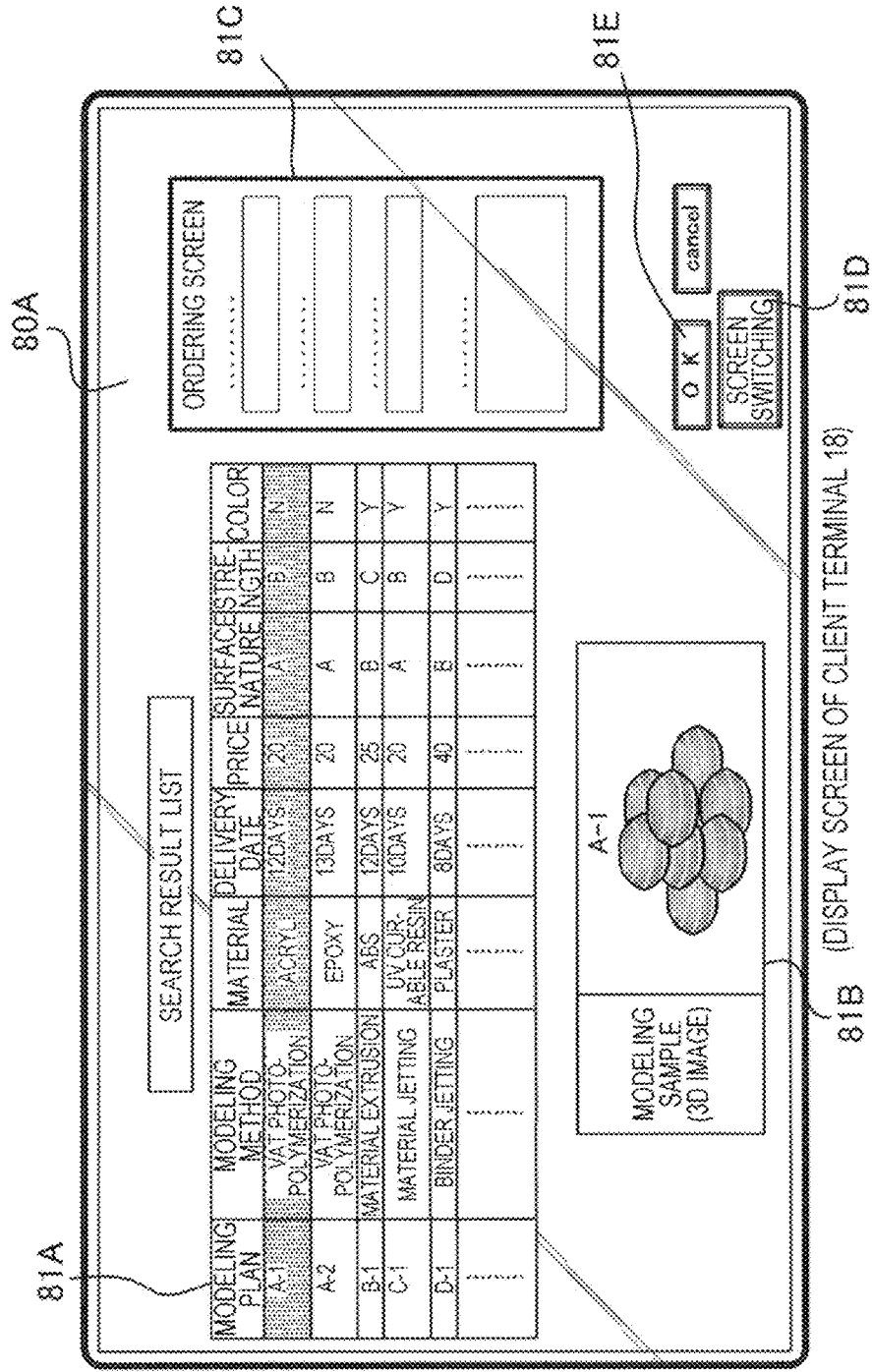
FIGS. 6A and 6B are front views of the display screen of the client terminal on which promotion images provided from the promotion site are displayed according to the present exemplary embodiment.
Figure 6B:
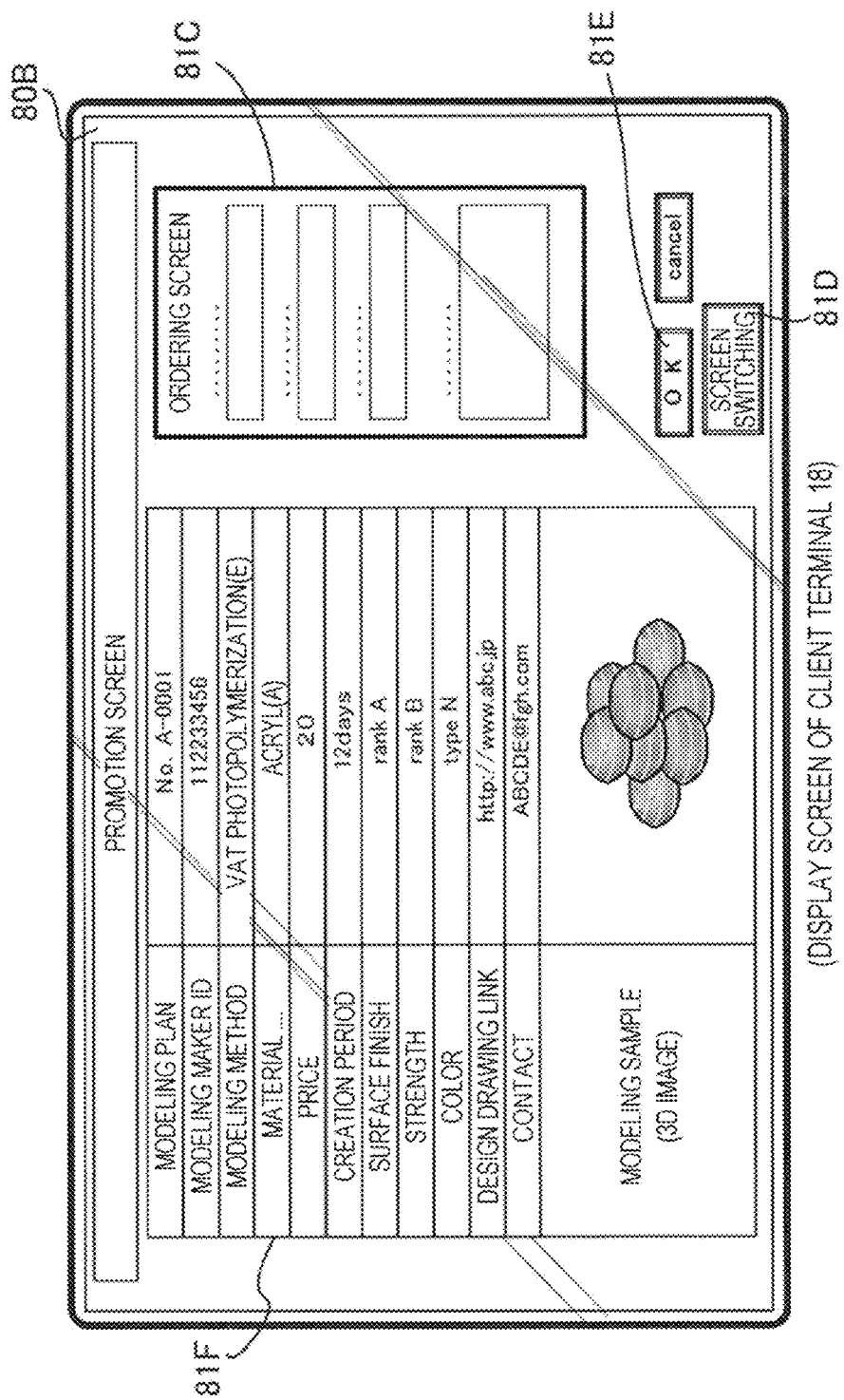

Thus, the promotion image 80A as illustrated in FIG. 6A and the promotion image 80B as illustrated in FIG. 6B are displayed on the display screen of the client terminal 18.

The promotion image 80A includes a table image 81A including plural modeling plans, a modeled object image 81B indicating a 3D modeled object and an ordering image 81C.

The table image 81A is displayed with items including a modeling method, a material, a delivery date, a price, a surface nature, a strength and a color for each of the plural modeling plans.

For example, when a client selects one modeling plan, a display form of the selected modeling plan is changed (indicated by mesh in FIG. 6A).

In this state, when a screen switching button 81D is operated, the promotion image 80A is switched to the promotion image 80B in which the table image 81A is switched to a modeling plan image 81F specialized for the meshed modeling plan as illustrated in FIG. 6B.

When the client inputs information required for ordering in the ordering image 81C and operates the OK button 81E, an ordering instruction is sent to the distribution management server 12. That is, this operation of the OK button 81E corresponds to the "ordering instruction" among the received information analyzed in the described-above step 102 of FIG. 7. Providing a system to allow a client to arbitrarily select one of plural modeling plans encourages sales promotion.

(Ordering Process Control)

Figure 10:
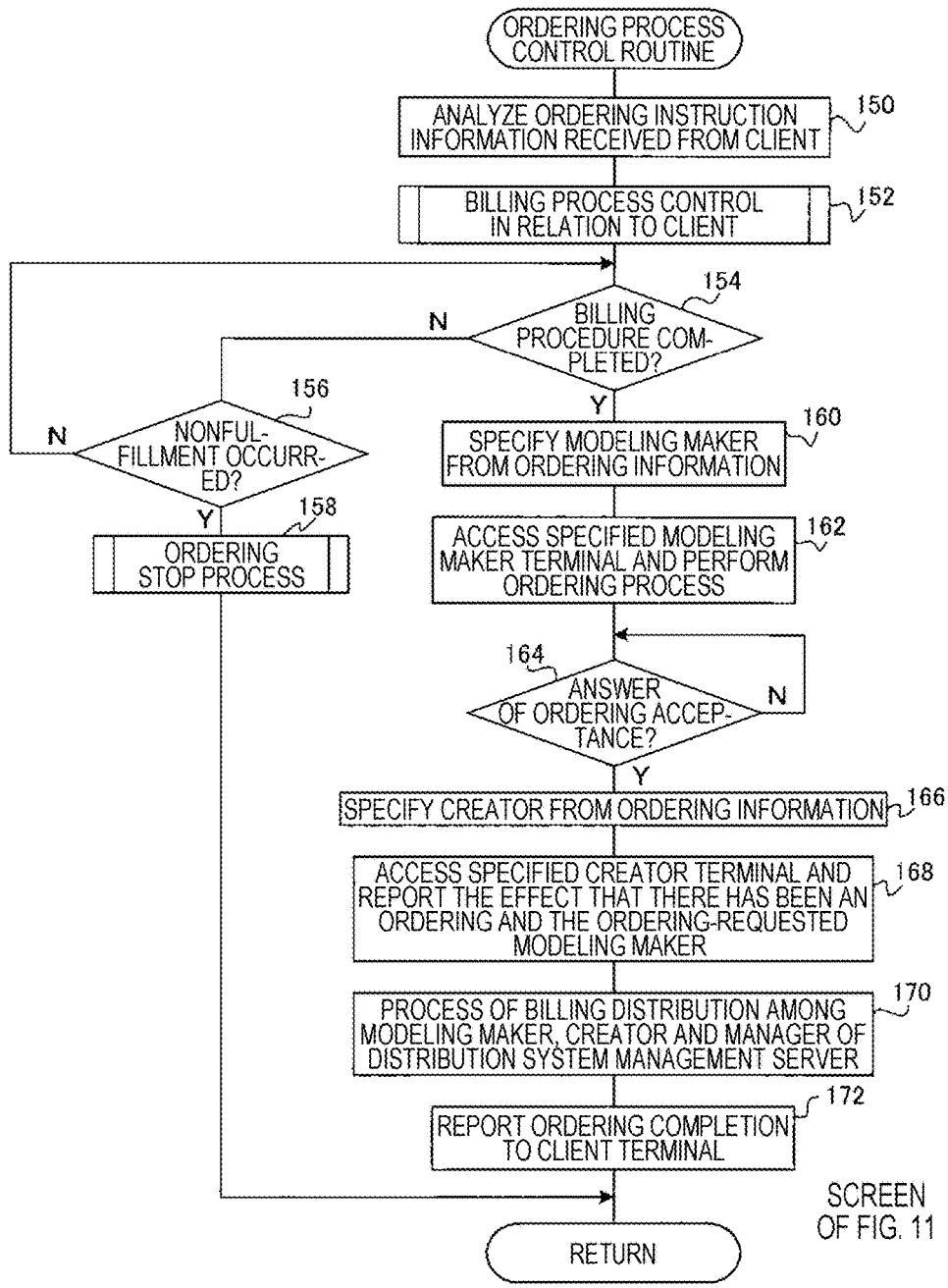
FIG. 10 is a flow chart illustrating an ordering process control routine executed in step 110 of FIG. 7.

FIG. 10 is a flow chart illustrating an ordering process control routine executed in step 110 of FIG. 7 in response to the ordering instruction from the client terminal 18.

At step 150, ordering instruction information received from the client terminal 18 is analyzed. Subsequently, the routine proceeds to step 152 to perform billing process control between the distribution management server 12 and a client. The billing process exchanges with the client terminal 18 a payment method of prices that a client pays to a modeling creator and a modeling maker and a commission paid to the distribution management server 12.

At next step 154, it is determined whether or not a billing procedure has been completed. When it is determined that the billing procedure has not been completed, the routine proceeds to step 156 to determine whether or not nonfulfillment has occurred. When it is determined in step 156 that nonfulfillment has not occurred, the routine returns to step 154 and repeats steps 154 and 156 until an affirmative determination is made in either step 154 or step 156.

When an affirmative determination is made in step 156, that is, when it is determined that nonfulfillment has occurred, the routine proceeds to step 158 to execute an ordering stop process and then is ended.

When an affirmative determination is made in step 154, it is determined that the billing procedure has been completed. Subsequently, the routine proceeds to step 160.

At step 160, a modeling maker is specified from the ordering instruction information. Subsequently, the routine proceeds to step 162 to access the specified modeling maker terminal 16 to execute the ordering process.

At next step 164, it is determined whether or not there has been an answer of ordering acceptance from the ordered modeling maker terminal 16. When an affirmative determination is made in step 164, the routine proceeds to step 166 to specify a creator from the ordering instruction information.

At next step 168, an access is made to the specified creator terminal 14 in order to report the effect that there has been an ordering and the ordering-requested modeling maker to the creator terminal 14.

At next step 170, a process of billing distribution among the modeling maker, the creator and a manager of the distribution management system is executed. Subsequently, the routine proceeds to step 172 to report the ordering completion to the client terminal 18 and is then ended.

Figure 11:
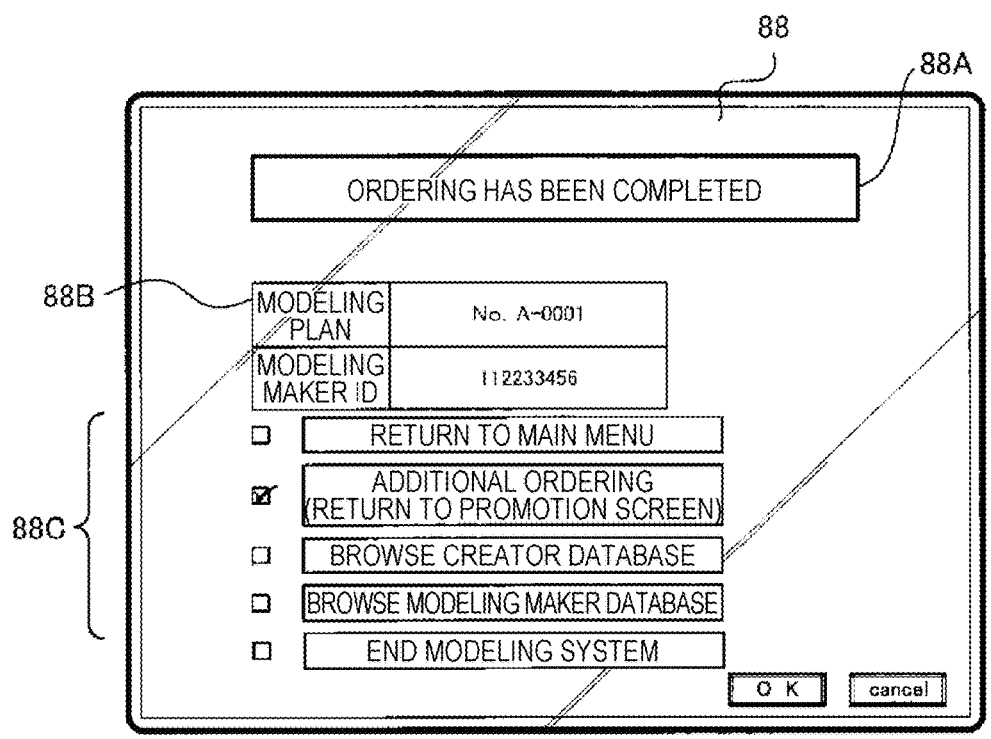
FIG. 11 is a front view of the display screen of the client terminal on which an ordering completion image provided from the promotion site is displayed according to the present exemplary embodiment.

Upon receiving the ordering completion report, a message image 88A and an ordering modeling plan specifying image 88B are displayed in an ordering completion image 88 illustrated in FIG. 11 on the display screen of the client terminal 18. The message image 88A indicates "the ordering has been completed" or the like. The ordering modeling plan specifying image 88B shows the ordered modeling plan and a specifying identification number.

A selection image 88C to select the items of "return to main menu", "additional ordering (return to promotion image)", "see creator database", "see modeling maker database", "end modeling system" and the like may be displayed in the ordering completion image 88.

(Billing Process)

The billing processing unit 86 of the delivery control site 24 may be configured to perform a billing by the registered number of creations from creators every certain period of month or year unit or perform a billing by a certain percentage of sales every time a creation is provided to a client.

A client selects, orders and receives a creation according to his/her taste through the distribution management server 12 of the modeled object distribution management system. Therefore, a process of taking charges paid by the client at the time of ordering or reception as sales proceeds, taking a certain percentage of the proceeds as a commission, and taking the rest as a deposit for the creator, for example, may be performed.

Individual creators may directly receive the rest from the client. However, since complexity is unavoidable, it is better to perform this process by means of the distribution management server 12.

(Modification 1)

In the present exemplary embodiment, when the promotion image 80A or 80B edited in the display image edit unit 72 is displayed on the client terminal 18, the promotion image 80A is displayed in the table format in FIG. 6A and the promotion image 80B is displayed in the window format in FIG. 6B.

In editing this display, when a recommendation plan is presented from a creator, for example, in the table format of FIG. 6A, a modeling plan corresponding to the recommendation plan of the creator may be displayed in the uppermost field.

In FIG. 6B, a display window of a modeling plan corresponding to the recommendation plan of the creator may be placed in the forefront at the start of display.

In either of the display forms of FIGS. 6A and 6B, the recommendation plan of the creator may be manifested and emphasized. As one example of the emphasis, information corresponding to the recommendation plan of the creator may be temporarily input in advance as a default value of the ordering image 81C.

(Modification 2)

In the present exemplary embodiment, each of plural modeling plans presented to a client determines information (such as modeling method, material, delivery date, price) designed based on the size of a creation of a creator. However, when an instruction to change the size is received from the client, the designed information may be changed according to the size for which the change instruction has been made.

For example, when the size is magnified, since the amount of applied material is increased, the cost of the material may be increased. When the size is changed, it is necessary to change a modeling method due to factors such as strength and so on. In addition, a delivery date may be varied by a variety of changes in the size.

In Modification 2, as a sub screen of the display screen displaying the promotion image 80A or 80B of FIG. 6A or 6B, a size change instruction image (not illustrated) to instruct a change in size may be added.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A modeled object distribution management system comprising:
    at least one hardware processor configured to implement:
        a creator storage unit that stores modeled object-related information including information indicating stereoscopic images, including a stereoscopic image, of created modeled objects, including a modeled object;
        a first display controller that displays the stereoscopic images to allow a client to browse the stereoscopic images, by using the information indicating the stereoscopic images which is stored in the creator storage unit; and
        a second display controller that displays a modeling plan to allow the client to browse the modeling plan, the modeling plan including a client selection of a modeling method and a material to physically make the modeled object corresponding to the stereoscopic image selected by the client from the stereoscopic images displayed in the first display controller,
    wherein the client selection is a selection of 3D-printing parameters of the modeled object,
    wherein the first display controller further displays the stereoscope images in response to a client search among any of the stereoscopic images and information of creators of the stereoscopic images,
    wherein the second display controller further displays a plurality of modeling plans for physically making a client selected one of the modeled objects displayed as the stereoscopic images by the first display controller, and
    wherein the client selection is a selection both among any plurality of photo-polymerization, extrusion, jetting, lamination, powder bed fusion and directed energy deposition as the modeling method and among any plurality of photo-polymerization materials, extrusion materials, jetting materials, lamination materials, powder bed fusion materials and directed energy deposition materials as the material.

2. The modeled object distribution management system according to claim 1, wherein the modeling plan displayed by the second display controller includes a modeling plan recommended by a creator of the modeled object.

3. The modeled object distribution management system according to claim 1, wherein the at least one hardware processor is further configured to implement:
    a modeling maker storage unit that stores information related to modeling makers capable of making modeled objects in different modeling methods, including the modeling method,
    wherein the modeling method is selected from the modeling methods with which the modeling makers stored in the modeling maker storage unit are able to make the modeled objects.

4. The modeled object distribution management system according to claim 2, wherein the at least one hardware processor is further configured to implement:
    a modeling maker storage unit that stores information related to modeling makers capable of making modeled objects in different modeling methods, including the modeling method,
    wherein the modeling method is selected from the modeling methods with which the modeling makers stored in the modeling maker storage unit are able to make the modeled objects.

5. The modeled object distribution management system according to claim 1, wherein the modeling plan includes information related to a price, a creation time, a surface finish state, a strength and a color in addition to the modeling method and the material.

6. The modeled object distribution management system according to claim 2, wherein the modeling plan includes information related to a price, a creation time, a surface finish state, a strength and a color in addition to the modeling method and the material.

7. The modeled object distribution management system according to claim 3, wherein the modeling plan includes information related to a price, a creation time, a surface finish state, a strength and a color in addition to the modeling method and the material.

8. The modeled object distribution management system according to claim 4, wherein the modeling plan includes information related to a price, a creation time, a surface finish state, a strength and a color in addition to the modeling method and the material.

9. A modeled object distribution management apparatus comprising:
    at least one hardware processor configured to implement:
        a promotion execution unit that executes a promotion by providing at least a stereoscopic image among information related to a modeled object created by a creator to a client terminal capable of communicating with a client;
        a delivery controller that provides a modeling plan including a client selection of a modeling method and a material to physically make a modeled object corresponding to a stereoscopic image selected by the client to the client terminal and receives an ordering of a modeled object;
a creator management unit that can receive information from a creator terminal capable of communicating with a creator and that manages information related to a modeled object designed by a creator, wherein the information related to a modeled object is required for the promotion executed by the promotion execution unit; and
a modeling maker management unit that can receive information from modeling maker terminals capable of communicating with modeling makers who own modeling devices with different modeling methods, including the modeling method, and can make modeled objects and that manages information related to the modeling makers who make the modeled objects, wherein the information related to the modeling makers is required to provide the modeling plan,
wherein the client selection is a selection of 3D-printing parameters of the modeled object,
wherein the at least one hardware processor is further configured to control display of the stereoscope images in response to a client search among any of the stereoscopic images and information of creators of the stereoscopic images,
wherein the at least one hardware processor is further configured to control display of a plurality of modeling plans for physically making a client selected one of the modeled objects displayed as the stereoscopic images, and
wherein the client selection is a selection both among any plurality of photo-polymerization, extrusion, jetting, lamination, powder bed fusion and directed energy deposition as the modeling method and among any plurality of photo-polymerization materials, extrusion materials, jetting materials, lamination materials, powder bed fusion materials and directed energy deposition materials as the material.

10. A non-transitory computer readable storage medium storing a program that causes a computer to execute a modeled object distribution management process, the process comprising:
registering information related to modeled objects designed by creators, in advance;
registering information related to modeling makers who own modeling devices with different modeling methods to make modeled objects, in advance;
providing at least stereoscopic images among information related to the modeled objects created by the creators to allow a client to browse the stereoscopic images;
providing a modeling plan including a client selection of a modeling method and a material to physically make a modeled object corresponding to a stereoscopic image selected by the client to allow the client to browse the modeling plan;
selecting a modeling maker and instructing a selected one of the modeling makers to make the modeled object, according to the modeling plan ordered from the client;
displaying the stereoscope images in response to a client search among any of the stereoscopic images and information of creators of the stereoscopic images;
displaying a plurality of modeling plans for physically making a client selected one of the modeled objects displayed as the stereoscopic images,
wherein the client selection is a selection of 3D-printing parameters of the modeled object, and
wherein the client selection is a selection both among any plurality of photo-polymerization, extrusion, jetting, lamination, powder bed fusion and directed energy deposition as the modeling method and among any plurality of photo-polymerization materials, extrusion materials, jetting materials, lamination materials, powder bed fusion materials and directed energy deposition materials as the material.

* * * * *